United States Patent [19]
Teel et al.

[11] 4,068,275
[45] Jan. 10, 1978

[54] GROUND FAULT PROTECTIVE APPARATUS AND METHOD

[75] Inventors: Billy E. Teel; Samuel L. Magruder, both of Ballwin, Mo.

[73] Assignee: Westinghouse Electric Corporation, Pittsburgh, Pa.

[21] Appl. No.: 694,427

[22] Filed: June 9, 1976

[51] Int. Cl.² .............................................. H02H 3/28
[52] U.S. Cl. ...................................... 361/44; 361/63; 361/87
[58] Field of Search .............. 317/26, 27 R, 44, 18 D, 317/28 R, 29 R; 361/44, 47, 48, 62–66, 87

[56] References Cited

U.S. PATENT DOCUMENTS

| 959,787 | 5/1910 | Nicholson | 317/26 |
|---|---|---|---|
| 2,335,103 | 11/1943 | Bolsterli | 317/28 B |
| 3,259,802 | 7/1966 | Steen | 317/26 X |
| 3,558,981 | 1/1971 | Zocholl | 317/26 X |
| 3,949,272 | 4/1976 | Smith | 317/18 D |

Primary Examiner—J D Miller
Assistant Examiner—Patrick R. Salce
Attorney, Agent, or Firm—Robert E. Converse, Jr.

[57] ABSTRACT

Apparatus for protecting power distribution networks from damage due to ground faults comprises a plurality of groups of zero sequence current monitors, each group surrounding all branches of the network which enter a zone of protection. Each group is electrically connected to produce an output signal corresponding to the vector sum of differential currents flowing into and out of the zone. Each group is connected to a ground fault relay which will trip when the vector sum of the differential currents entering or leaving a zone is above a predetermined level.

5 Claims, 6 Drawing Figures

GROUND FAULT PROTECTIVE APPARATUS AND METHOD

BACKGROUND OF THE INVENTION

1. Field of the Invention

This invention relates in general to power distribution networks and, more particularly, to means for protecting power distribution networks from damage due to ground faults.

2. Description of the Prior Art

Networks of bus bars and cables are used to distribute electric power from a source of supply, such as a transformer, to the point where it is ultimately used by motors, lights,, or other loads. In order to provide for safe operation of these networks overcurrent protection has traditionally been supplied, using circuit interrupters such as fuses, switches, and circuit-breakers to interrupt current flow through a portion of the network when such current flow rises above a safe level. The current level at which overcurrent protective devices operate is normally set at the point at which current flow through the conductors of the network produces sufficient resistance heating to damage the conductors themselves or objects in close proximity to the conductors. Such overcurrent conditions can occur due to short circuits between the conductors or in the apparatus being powered by the network.

Another type of undesired condition which can occur in power distribution networks is a ground fault. This is produced when current flows from a network phase conductor to an object at ground potential. The fault may be either a bolted fault, that is, a direct metallic connection between the network conductor and an object at ground potential, or an arcing fault wherein current flows through an arc between the network conductor and the grounded object. Either type of fault can result in fault current which is below the level at which overcurrent protection devices are set to trip, yet which can still cause serious damage. In multiphase ungrounded systems an arcing fault can cause voltage at other points in the network to rise to values several times higher than the normal system voltage, thereby causing damage to equipment connected to the network. In addition, the heat produced by an arcing fault is often sufficient to cause fire or explosion in the facility being served by the power distribution network.

In providing ground fault protection, devices such as current monitors are used to detect ground fault currents much below the tripping level of overcurrent protective devices. These devices operate in alternating current sytems by encircling all conductors of a branch of the network. Under normal conditions, all branch current traveling away from the power source on one branch conductor must return on one or more of the other branch conductors. Thus, the net, or differential, current flow through the branch surrounded by the current monitor is zero.

When traditional ground fault protective schemes are applied to multiphase alternating current networks incorporating a neutral conductor, the difficulty of providing ground fault protection is increased. Unbalanced loads on the network can cause current to flow through the neutral conductor which can result in a spurious ground fault indication by the current monitor. This problem is intensified when a network is served by multiple sources of power, each having its neutral grounded at a separate point with a common neutral connection. In the past, providing ground fault protection on such a system has required careful routing of phase and neutral conductors, with the ultimate layout resulting in greater lengths of conductor than would be needed for systems not having ground fault protection. Other prior art ground fault schemes were further complicated with interlocking circuit-breakers and other auxiliary equipment.

It would be desirable to provide a ground fault protection system giving greater flexibility in routing of conductors while eliminating the need for complex interlocking or excessive auxiliary control equipment. It is also desirable to provide a ground fault system which will not be affected by grounding the neutral conductor of multisource networks at multiple points.

SUMMARY OF THE INVENTION

In accordance with a preferred embodiment of the present invention there is provided a system for protecting a power distribution network from damage due to ground faults by dividing the network into zones of protection. Means for detecting differential current are placed on each branch of the network which enters a specified zone. The differential current detecting means are connected to measure the net differential current flow through all branches entering or leaving the zone. A ground fault occurring on the network within that particular zone will result in a high value of net differential current as detected by the multiple differential current detecting means associated with the network branches entering the zone. A ground fault occurring on the network which is outside of the zone of protection defined by the multiple connected differential current monitors will not result in a high value of net differential current flow through the zone. Each group of differential current detecting means is associated with switch means operable upon detection of net differential current flow in the zone to activate circuit interrupting devices to isolate the zone from all sources supplying power to the zone.

Unbalanced loads producing current through the neutral conductors of the network and multiple grounded neutral sources supplying the network will not affect the operation of the ground fault protective system and will not result in increasing the complexity or length of network conductors beyond that which would be required for a network not having ground fault protection.

BRIEF DESCRIPION OF THE DRAWINGS

For a better understanding of this invention, reference may be had to the detailed description of the preferred embodiment and to the accompanying drawings, in which.

DESCRIPTION OF THE PREFERRED EMBODIMENT

Figure 1:
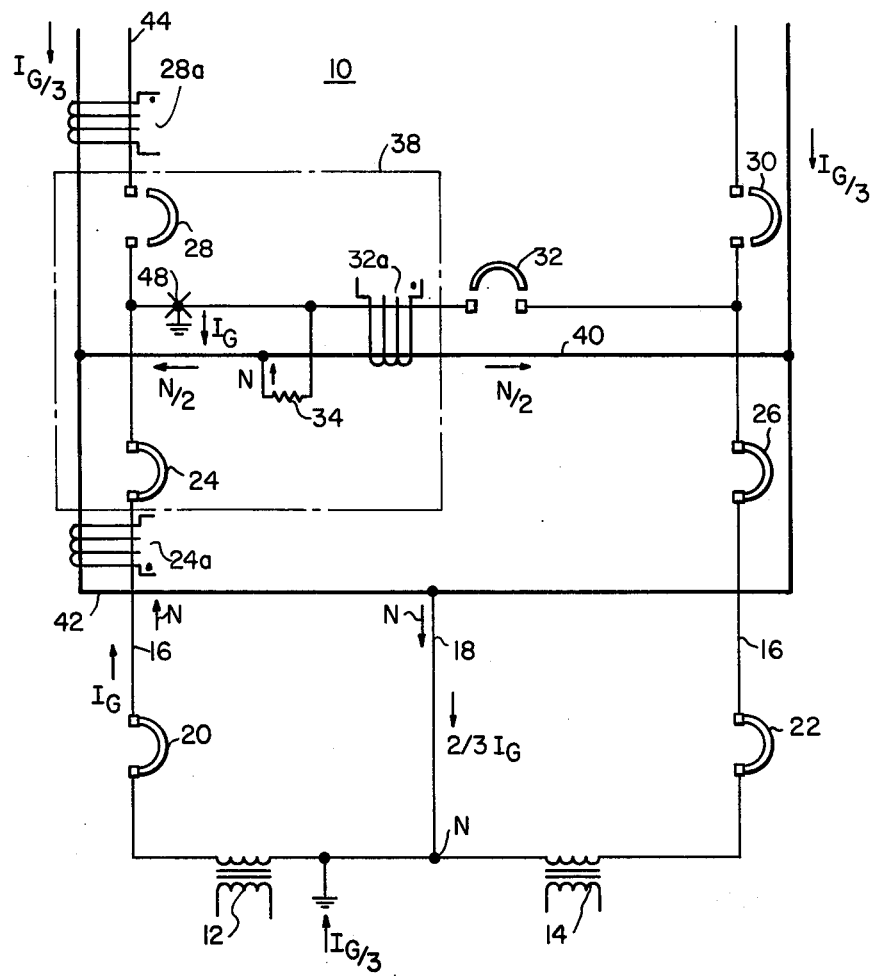
FIG. 1 is a schematic one-line diagram of a three-phase open-ended neutral system employing the principles of the present invention.

Referring now to the drawings, FIG. 1 shows a one-line schematic diagram of a three-phase four-wire open-ended neutral system employing the principles of the present invention. A pair of three-phase grounded-neutral transformers 12 and 14 supply power to the network 10 through the three phase conductors represented by the line 16 and the neutral conductor 18. Overcurrent protection is supplied to the system 10 by the circuit breakers 20, 22, 24, 26, 28, 30 and 32. The normal positions of the circuit breakers 20 through 32 are shown in FIG. 1.

Zero sequence current monitors 24a, 28a, and 32a are mounted upon the system 10 at the position shown in FIG. 1. These current monitors measure the differential current through the phase and neutral conductors which they surround. That is, if the vector sum of current flowing through the four conductors in one direction equals the vector sum of current flowing through the conductors in the other direction, the current monitor will produce a zero output. However, if current in one direction through the conductors exceeds corresponding current flow in the other direction, the current monitor will produce an output corresponding to the difference between the current flows in the two directions.

A three-phase unbalanced load 34 is supplied by the network 10. As can be seen in FIG. 1, the unbalance produced by the load causes a neutral current N to flow. This neutral current flows from the load into the network, at which point it divides in some proportion, for example half in each direction as shown in FIG. 1.

Figure 2:
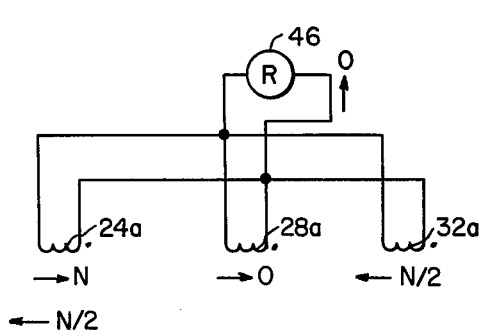
FIG. 2 is a schematic diagram showing the normal flow of neutral current in the system of FIG. 1.

A zone of protection 38 can be established on the system 10. The zone 38 includes three branches 40, 42 and 44 of the network 10, with each branch comprising three phase conductors and a neutral conductor. The circuit breakers 24, 28 and 32 and corresponding current monitors 24a, 28a and 32a provide protection for the zone 38. The current monitors 24a, 28a and 32a are connected in parallel as shown in FIG. 2, and have their outputs connected to a relay 46 which is responsive to an output signal from the three current monitors. Control circuitry is provided between the relay 46 and the circuit breakers 24, 28 and 32 so that upon actuation of the relay 46, the breakers 24, 28 and 32 will be tripped.

During normal operation, neutral current flows in the network 10 as shown in FIG. 1. This neutral current produces an output from the current monitors 24a and 32a (FIG. 2) since the current flow in each direction produces a net differential current. For example, the monitor 24a senses a flow N in the upward direction as seen in FIG. 1 and a flow N/2 in the downward direction as seen in FIG. 1, producing a net output signal. However, the current monitor 32a senses a differential curent equal to N/2 also. Since the monitors 24a and 32a are connected as shown in FIG. 2, the vector sum of the outputs of the three current monitors as seen by the relay 46 is zero. The relay 46 therefore remains unactuated, and the neutral current produced by the unbalanced load 34 will not result in a nuisance trip.

Figure 3:
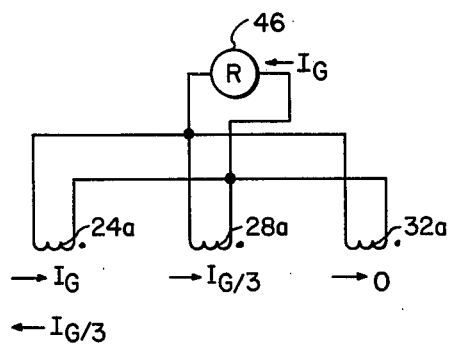
FIG. 3 is a schematic diagram illustrating the flow of ground current which occurs during a ground fault on the system shown in FIG. 1.

A ground fault within the boundaries of the zone of protection 38 will result in a flow of ground current $I_G$. Such a ground fault is shown at the point 48 in FIG. 1 and causes ground current to flow in the various conductors of the network 10 as shown in FIG. 1. This ground current will be sensed by the current monitors 24a, 28a and 32a as shown in FIG. 3. The ground current flow through the current monitors connected as shown in FIGS. 2 and 3 produces a net output equal to the transformed value of the ground current $I_G$, thereby actuating the relay 46. The relay 46 in turn trips circuit breakers 24, 28 and 32, thereby isolating the ground fault at point 48 from the rest of the network 10.

Figure 4:
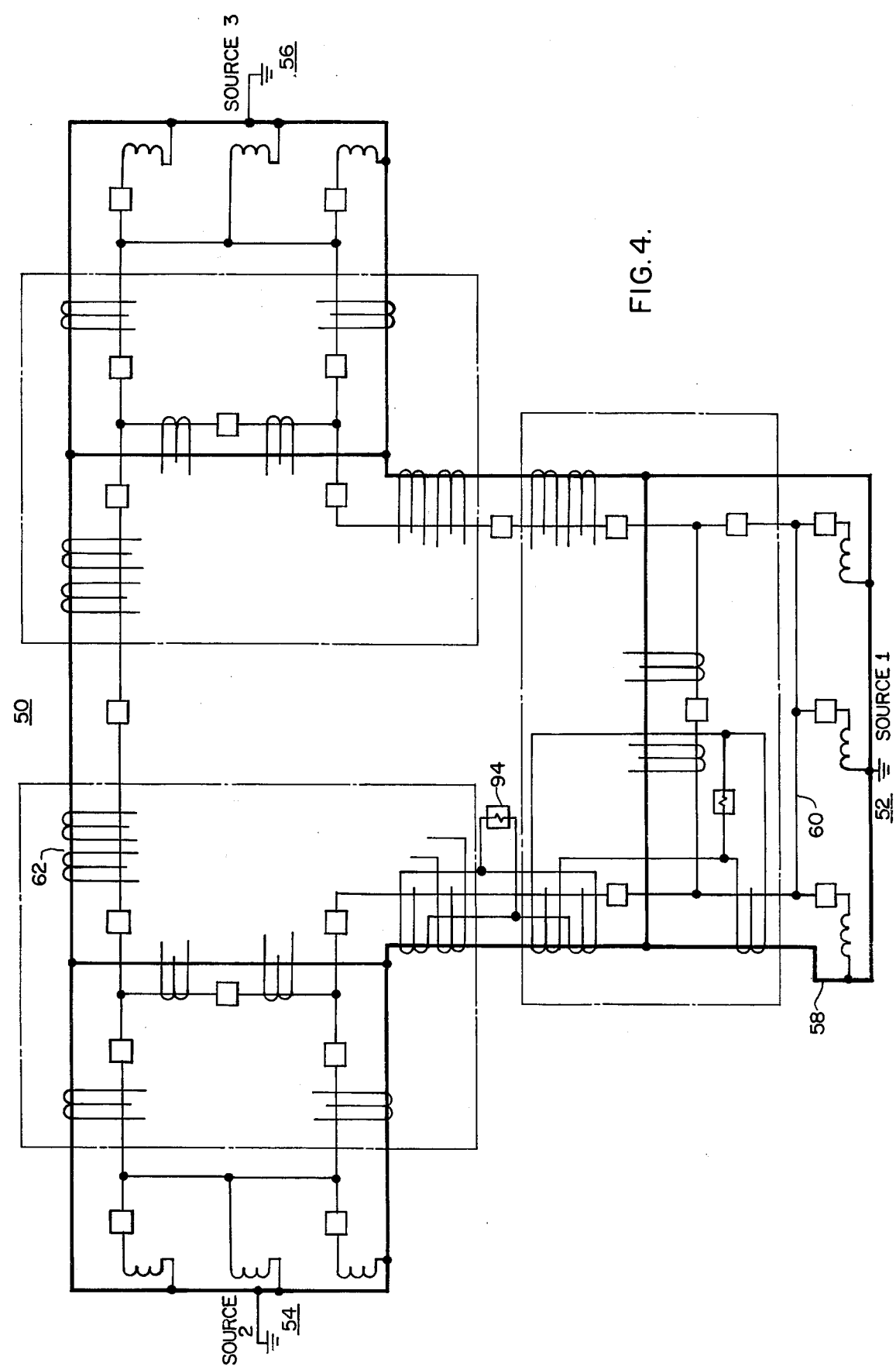
FIG. 4 is a one-line schematic diagram of a three-phase closed neutral loop system employing the principles of the present invention.

A large complex multisource network 50 is shown in FIG. 4. The network 50 includes three power sources 52, 54 and 56 each comprising a trio of three-phase grounded-neutral transformers. The grounded neutral terminal of each of the nine transformers is connected to a neutral bus 58 which extends throughout the network 50 as a closed loop. The phase windings of each of the transformers of the sources 52, 54 and 56 are connected to phase conductors which are also connected in a closed loop system. The three phase conductors are represented by a lighter line 60.

In accordance with the principles of the present invention, the newtork 50 is divided into a plurality of zones of protection, the boundaries of which are represented by broken lines in FIG. 4. Overcurrent protection and control of the network 50 is provided by a plurality pf circuit breakers represented by square symbols in FIG. 4. A plurality of zero sequence differential current sensing devices represented by the symbols shown, for example, at the point 62 provide ground fault protection for the network 50. For purposes of clarity, the connections between the zero sequence differential current sensing devices and associated relays are not shown in FIG. 4. A detailed diagram of a portion of the network 50, representative of entire network, is shown in FIG. 5.

Figure 5:
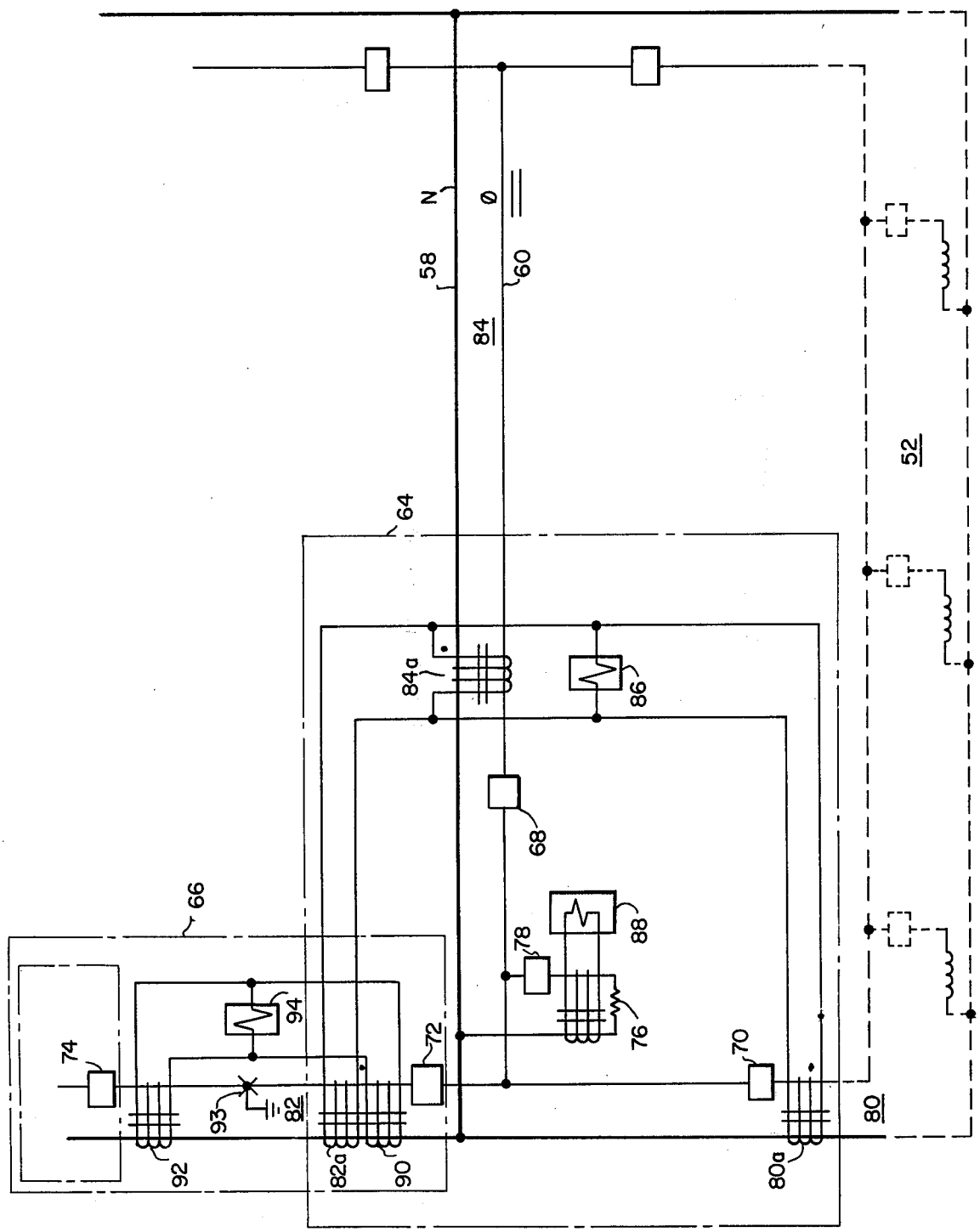
FIG. 5 is a detailed schematic drawing of a portion of the system shown in FIG. 4.

It can be seen in FIG. 5 there is provided a local zone of protection 64 and a transmission line zone of protection 66. Overcurrent protection and control of the zone 64 and 66 is provided by a bus tie circuit breaker 68, a main circuit breaker 70, a zones tie circuit breaker 72, and a remote tie circuit breaker 74. A three-phase unbalanced load 76 is supplied from the network 50 through a feeder circuit breaker 78.

It can be seen that the load 76, and any other loads which may be located within the boundaries of the local zone 64, are supplied through three paths of network branches 80, 82 and 84. Each of these branches includes a corresponding zero sequence differential current sensing device, or current monitor 80a, 82a and 84a. These current monitors are connected as shown in FIG. 5, and are also connected to the relay 86. Ground fault protection for the load 76 is provided by a separated current monitor-relay combination 88. The transmission line zone 66 includes current monitors 90 and 92, the outputs of which are connected to relay 94.

A ground fault occurring anywhere within the boundaries of the zone 64 will cause current flow through the phase conductors 60 and neutral conductor 58 of the branches 80, 82 and 84 which will be detected by the current monitors 80a, 82a and 84a. With the current monitors connected as shown in FIG. 5, the outputs of the three current monitors 80a, 82a and 84a will produce a net non-zero output, causing the relay 86 to actuate. A ground fault occurring anywhere outside the boundaries of the zone 64 may also cause differential currents to flow through the current monitors 80a, 82a and 84a. However, a ground fault occurring outside the border of the zone 64 will cause the outputs of the current monitors 80a, 82a and 84a to cancel, thereby producing a net output of zero. In other words, the net current flow into the zone 64 under these conditions is equal to the net current flow out. The relay 86 will therefore not be actuated. For example, a ground fault at the point 93 will result in a net output from monitors 80a, 82a and 84a of zero. However, the monitors 90 and 92 will produce a net output unequal to zero, thereby actating the relay 94.

Figure 6:
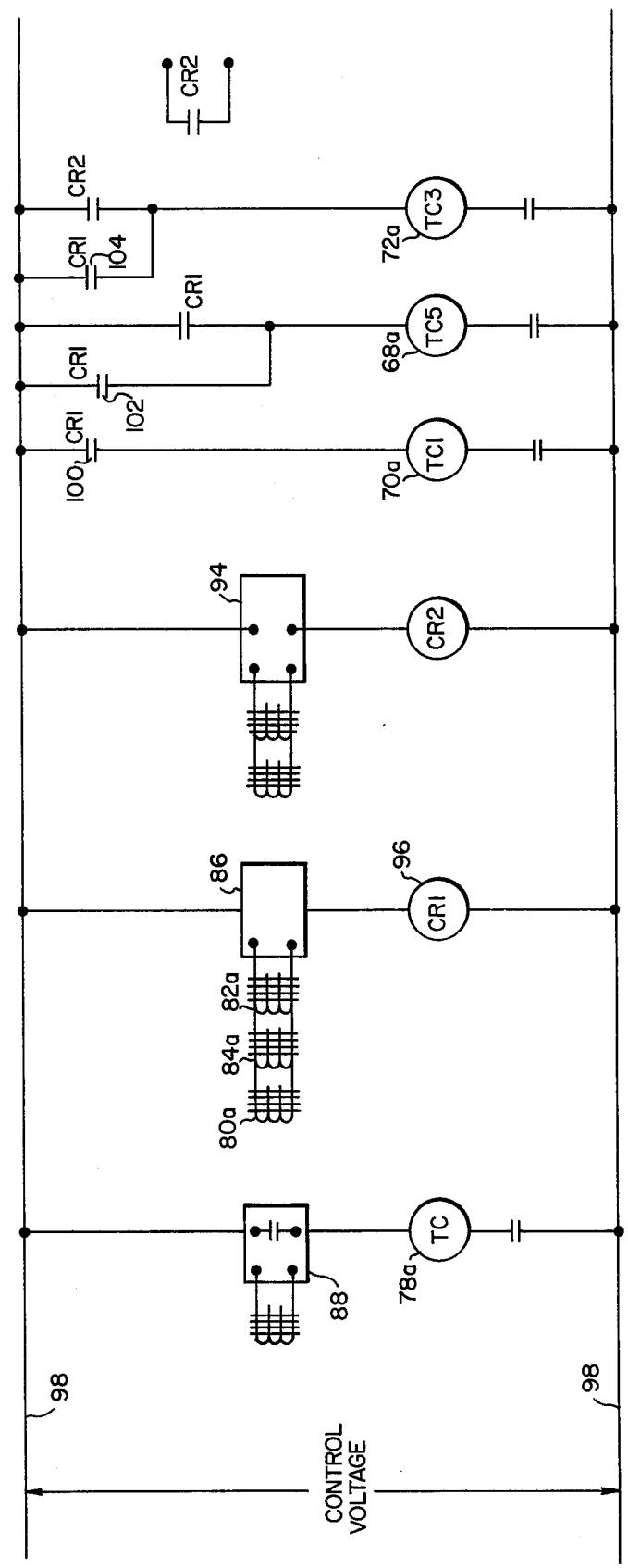
FIG. 6 is a schematic diagram of a control scheme which could be used with the system shown in FIG. 4.

The contact outputs of the relays 86 and 94, as well as the monitor-relay combination 88 may be connected as shown in FIG. 6. For example, a ground fault within the zone 64 which actuates the relay 86, will cause the coil 96 to be energized by control lines 98. This energization will close contacts 100, 102 and 104. This will energize trip coils 68a, 70a and 72a of the respective circuit breakers 68, 70 and 72, thereby tripping the breakers and isolating the zone 64 from the network 50. If a ground fault should occur at the load 76, this will be sensed by the current monitor relay combination 88. Trip coil 78a will then be energized, tripping the circuit breaker 78 and isolating the load 76 from the network 50. In addition, if desired, the current monitor-relay combination 88 can interlock with the relay 86 to prevent energization of relay 86 when a ground fault occurs upon load 76. This will prevent the entire zone 64 from being isolated from the network 50 when a ground fault occurs when it is known to be located at the load 76.

It can be seen in FIG. 5 that current monitors associated with adjacent zones are overlapped, thereby providing complete coverage of the portion of the network 50 located in the respective zones. A greater or lesser number of zones can be established in a given network, depending upon the degree of protection required and the importance of service continuity to the various loads supplied by the network.

By using the principles of the present invention, it is possible to minimize the length of control connections required between the current monitors of each zone. This is of particular concern when parts of a common power system may be in different buildings located some distance apart. Each ground fault relay and its associated current monitors are independent of devices in other zones, thereby simplifying the interconnection wiring of the total system ground fault protection system. By using the principles of the present invention it is possible to provide ground fault protection on networks supplied by multiple sources having neutral conductors grounded at multiple points. The principles of the present invention can be employed on such systems without concern for the multiple paths that exists for ground fault or normal neutral current flow. These principles can be implemented using standard practices and standard equipment without the need for additional neutral bus runs or four pole circuit breakers. It can be seen therefore that the present invention provides a simpler, more economical method of providing ground fault protection on distribution networks supplies by multiple sources grounded at multiple points.

What is claimed is:

1. Apparatus for detecting ground faults on an associated alternating current network, comprising:

a plurality of groups of zero sequence current monitors, the monitors of each group being electrically isolated from every other group and surrounding conductors of the associated network which define a portion of the associated network as a zone of protection, the monitors of each group being connected to produce a current output signal whenever current flow through the conductors of the associated network into the zone of protection differs from current flow through the conductors of the associated network out of the zone of protection by more than a predetermined amount; and a plurality of current-sensitive ground fault sensors, each sensor being connected to the output of a current monitor group and being adapted to actuate an associated circuit interrupter device upon receipt of an output current signal from its connected current monitor group.

2. Apparatus for protecting a power distribution network from damage due to ground faults, comprising:

a plurality of groups of current transformer means for detecting differential current flow, each group being electrically isolated from every other group being associated with a zone of the network being protected, each of said current transformer means surrounding phase and neutral conductors of a network branch entering the associated zone and measuring differential current through all of said conductors, the current transformer means of each group being connected so as to measure net differential current through all branches entering the associated zone;

circuit interrupter means operable upon actuation to isolate a portion of the distribution network being protected from the remainder of the network; and a plurality of current-sensitive switch means, each of said switch means being connected to one of said groups of current transformer means, each of said switch means being connected to said circuit interrupter means and operable upon detection of net differential current through all branches crossing a zone boundary above a predetermined level to actuate said circuit interrupter means and isolate the associated zone from the remainder of the network.

3. Apparatus as recited in claim 2, wherein said current transformers comprise zero sequence current monitors.

4. Apparatus as recited in claim 3, wherein said switch means comprise ground fault sensors.

5. Apparatus as recited in claim 4, wherein said ground fault sensors comprise relays.

* * * * *